April 7, 1970     W. J. YULE     3,505,663

POWER SOURCE CONDITION INDICATOR

Filed Dec. 20, 1965

INVENTOR.
William J. Yule
BY
Hugh L. Fisher
ATTORNEY

12

3,505,663
POWER SOURCE CONDITION INDICATOR
William J. Yule, Flint, Mich., assignor to General
Motors Corporation, Detroit, Mich., a corporation
of Delaware
Filed Dec. 20, 1965, Ser. No. 514,888
Int. Cl. G08b 19/00, 21/00
U.S. Cl. 340—248                         3 Claims

ABSTRACT OF THE DISCLOSURE

A power source condition indicator incorporating a pair of switching transistor biased so as to respond to low and high voltage conditions. Each switching transistor causes a visual warning to be provided by an indicator.

---

This invention relates to condition indicators for providing information, although not exclusively, about the low and high power states of an electrical power source.

With a vehicle battery as an example of a power source, it can be appreciated that it would be desirable for an operator to know when the battery output voltage is either excessively low or excessively high. If the battery output voltage is too low, it may indicate an impending battery failure or that the battery is being overloaded for some reason. On the other hand, if the battery output voltage is too high, it usually indicates that the voltage regulator is malfunctioning. Of course, an excessive output voltage can damage the various vehicle accessories.

Accordingly, there is proposed a novel condition indicator for advising an observer that the output from a power source is either too low, too high or satisfactory. It is further proposed to provide such a novel indicator having simplified circuitry involving a minimum of components. This simplified circuitry renders the indicator capable of not only instantly providing visual warning about certain power source conditions, but also facilitates inspection for quality control purposes.

The foregoing and other objects and advantages of the invention will be apparent from the following description and the accompanying drawings, in which.

Figure 1:
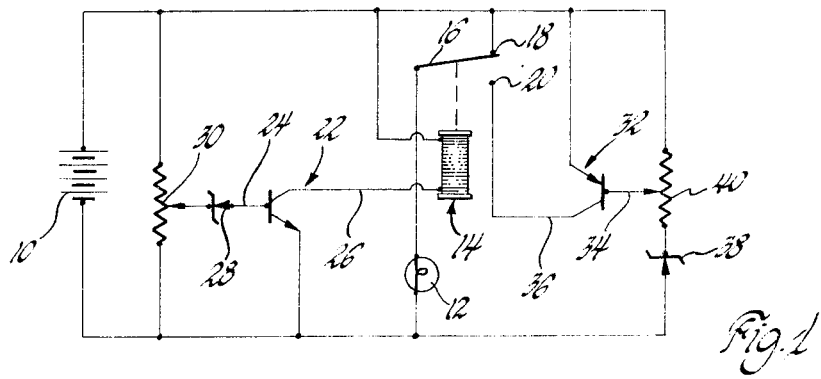
FIGURE 1 is a schematic diagram of a circuit incorporating the principles of the invention.

Referring now to the circuit displayed in FIGURE 1, the numeral 10 denotes a power source, which for explanatory purposes will be assumed to be a vehicle battery that has a normal voltage range from 11.6 volts to 15 volts. An indicator lamp 12 with the usual on and off states for visually warning that the voltage is either below 11.6 volts or above 15 volts is arranged to be switched into and out of the circuit with the battery 10. This is done by any appropriate arrangement; e.g., by a relay 14 having an armature 16 that is either engageable with a normally closed contact 18 or a normally open contact 20. In the illustrated position of the armature 16 the indicator lamp 12 will be on, being energized by full battery voltage. As will be explained, this illustrated position of the armature 16 occurs when the battery is below the 11.6 voltage value mentioned. The lamp 12 will also be illuminated when the battery voltage is above 15 volts.

The energization of the relay 14 is achieved by a switching provision employing an NPN transistor 22 connected into the circuit as a common emitter, with its base-emitter circuit 24 serving as the input and its collector-emitter circuit 26 serving as the output. The base of this transistor 22, which for identification purposes will be referred to as the low voltage transistor since this designation relates to its function, includes a voltage breakdown device, such as a Zener diode 28, and a variable resistor 30, which is connected across the battery 10. The Zener diode 28, for explanatory purposes only, breaks down when the voltage imposed thereon is between 6½ to 7 volts and thus conducts to complete the base-emitter circuit 24. The low voltage transistor 22, therefore, is turned on and the resultant current flow in its collector-emitter circuit energizes the relay 14, which is illustrated as joined to the collector of the transistor 22. Energization of the relay 14 moves the armature 16 into engagement with the normally open contact 20, and the lamp 12 goes off since it is no longer connected across the battery 10.

The variable resistor 30 is adjusted so that the 6½ to volts is applied to the Zener diode 28 when the voltage from the battery 10 is within the accepted range of 11.6 to 15 volts. It is, therefore, known that battery voltage is within this accepted range since the lamp 12 is out.

If for some reason, for instance, a voltage regulator malfunctions, and the voltage from the battery 10 exceeds the 15 volts, another switching arrangement employing a PNP type transistor 32 connects the lamp 12 again to the battery 10. The transistor 32, as with the transistor 22, will be referred to as the high voltage transistor so as to relate its identity to its function. This high voltage transistor 32 is connected into the circuit as a common collector and has its base-collector circuit 34 serving as an input and its emitter-collector circuit 36 as an output. Connected to the base of the high voltage transistor 32 is another voltage breakdown device, such as a Zener diode denoted by the numeral 38, and a variable resistor 40. The Zener diode 38 will commence to conduct when the voltage thereacross is approximately 13½ volts and, of course, the variable resistor 40 is so adjusted. When the Zener diode 38 conducts, the high voltage transistor 32 will turn on; and since the lamp 12 is connected by the relay 14 through the armature 16 and the normally open contact 20 to the collector of the high voltage transistor 32, the lamp 12 will illuminate. This indicates the high or excessive voltage condition.

Reviewing briefly the operation of the FIGURE 1 circuit, if the output voltage from the battery 10 is below 11.6 volts, which corresponds to a low voltage or discharging condition, the proportion of this voltage determined by the setting of the variable resistor 30 applied across the Zener diode 28 is not sufficient to render the Zener diode 28 conductive. Hence, the low voltage transistor 22 will be off and the relay 14 deenergized. The relay 14, when deenergized, has its armature 16 engaged with the normally closed contact 18 so that battery voltage is applied across the indicator lamp 12, illuminating it. This provides one warning.

If the battery voltage 10 is between 11.6 and 15 volts, which is the range of satisfactory charging operation, the corresponding proportion of battery voltage determined by the variable resistor 30 is applied across the Zener diode 28 to render it conductive and, correspondingly, the low voltage transistor 22. The relay 14 is now energized and its armature 16 is moved into engagement with the contact 20. Since in this voltage range the high voltage transistor 32 is nonconductive, the lamp 12 is in effect open circuited and remains off.

Next, if the voltage from the battery 10 exceeds 15 volts, which corresponds to a high voltage or overcharging condition, the proportion thereof imposed across the Zener diode 38, as determined by the variable resistor 40, will afford the on bias for the high voltage transistor 32 and it will conduct and cause the indicator lamp 12 to be illuminated. Again a visual warning is provided.

From the foregoing it will be appreciated that the vehicle operator will know that when the indicator lamp 12 is illuminated the battery 10 is being either excessively discharged or excessively overcharged and can take the appropriate steps to eliminate the undesired condition.

Figure 3:
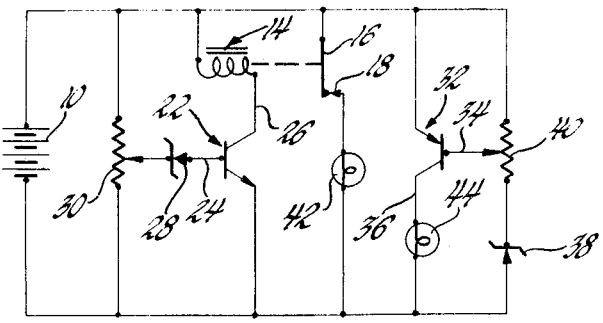
FIGURE 3 is a schematic diagram of a modification of the FIGURE 1 circuit.

The FIGURE 3 circuit identifies the condition of the battery 10, i.e., whether it is being discharged or overcharged. In describing this FIGURE 3 circuit the components thereof, which are the same as those in the FIGURE 1 circuit, will be assigned the same number. In this FIGURE 3 circuit when the battery voltage is below the 11.6 volts, the low voltage transistor 22 is nonconductive and, hence, the relay 14 has its armature 16 engaged with the normally closed contact 18. This connects a low voltage indicator lamp 42 across the battery 10 and it will illuminate to warn the operator that the battery 10 is being discharged.

If the battery output voltage is within the normal range mentioned before, i.e., from 11.6 volts to 15 volts, the low voltage transistor 22 will be conductive and the relay 14 energized to move the armature 16 out of engagement with the normally closed contact 18. This open-circuits the low voltage indicator lamp 42 and it turns off.

When the next extreme condition occurs, i.e., when the battery 10 is being overcharged and its output exceeds the 15 volts, the high voltage transistor 32 will conduct. Since the high voltage transistor 32 has a high voltage indicator lamp 44 connected to its collector, the resultant current flow in the emitter-collector circuit 36 will energize the high voltage indicator lamp 44 and warn the operator that the battery 10 is being overcharged. This FIGURE 3 circuit, therefore, facilitates the determination of the malfunction, producing either the discharging or overcharging condition of the battery 10.

Figure 2:
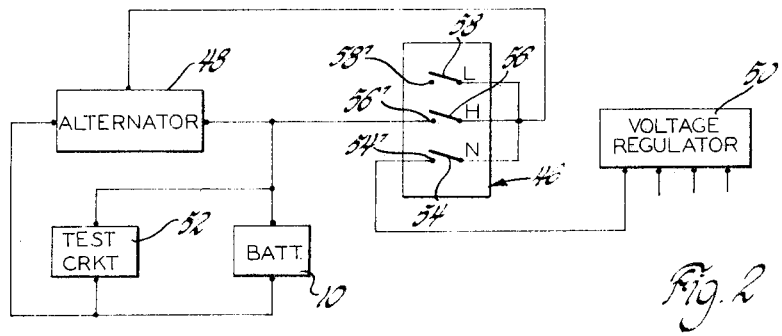
FIGURE 2 is a schematic diagram of a switch circuit for monitoring the operation of the FIGURE 1 circuit.

In FIGURE 2 an arrangement is shown for checking the FIGURES 1 and 2 circuits to determine whether they are properly responding to the three conditions; namely, low voltage, high voltage or normal voltage outputs. This is accomplished by a test switch, shown generally at 46, that can be used in circuit with the usual vehicle electrical system including a conventional alternator 48, the battery 10, a voltage regulator 50 and a circuit 52, such as that in FIGURE 1 or FIGURE 3, being tested.

To verify the operation of the circuit 52, assuming for demonstration purposes that a FIGURE 1 circuit is being checked, the switch 46 is actuated so that its switch arm 54 is engaged with its contact 54'. This connects the voltage regulator 50 to the field coil of the alternator in the usual way and imposes on the test circuit 52 a voltage within the accepted range, 11.6 to 15 volts, corresponding to the normal charging condition of the system. The circuit 52 should not respond, i.e., the indicator lamp 12 should remain off, unless of course the circuit 52 is malfunctioning.

When the switch 46 is adjusted so that its switch arm 56 is engaged with its contact 56', the voltage regulator 50 is shunted or disconnected from the field coil of the alternator 48 and the battery 10 will, without voltage regulation, be overcharged, for as is well known the alternator field current will increase until the field coil reaches its saturation point. The circuit 52 should respond by illuminating the lamp 12. It will sometimes require two or three minutes before the overcharge condition of the battery develops provided the accessory load on the system is maintained at a minimum. Again if the circuit 32 does respond properly, it is known that a defect exists.

The low voltage condition can be simulated by again maneuvering the switch 46 so that its switch arm 58 is engaged with its contact 58', which may be some type of ground connection or the equivalent for discharging the battery 10. This, as with the high voltage condition, may take some time before the circuit 52 responds and indicates the low voltage condition. Of course, as mentioned, if the circuit 52 is defective it will not respond.

In utilizing the test switch 46 caution must be observed so that the battery 10 is not placed in either the high voltage or low voltage condition for any extended time, otherwise, the battery 10 could be irreparably damaged.

The arrangement of FIGURE 2 has been described when testing a FIGURE 1 circuit. It can, however, be also used to check a FIGURE 3 circuit and will, of course, perform in exacty the same way except that the low voltage lamp 42 should illuminate when the switch 46 is adjusted for the low voltage condition and the high voltage lamp 44 should illuminate when the switch 46 is adjusted for the high voltage condition.

From the foregoing it will be appreciated that with the described uncomplicated, simplified circuit the output of a power source, such as a vehicle battery, can be accurately monitored to afford instantaneous warning about either an overcharge or undercharge condition. This offers the vehicle operator an opportunity to correct the trouble before irreparable damage occurs either to the battery or some parts of the electrical system.

It should be kept in mind, as has been suggested, that the various values such as voltages values were suggested only for demonstration purposes. This also applies to the use of a vehicle battery as an example in the foregoing description. Then too, as those versed in the art will appreciate, the transistor types; i.e., PNP or NPN, can be changed as can the bias arrangement utilizing Zener diodes. For example, some kind of an impedance may afford the appropriate operating bias.

What is claimed is:

1. A condition indicator for a voltage source comprising an indicator having on and off states, low and high voltage switching means operative to cause the indicator to change to the on state indicating that the voltage is either below a certain minimum or above a certain maximum, each of the low and high voltage responsive switching means including an electronic switching device having the input circuit thereof communicating with the source and the output circuit thereof operatively associated with the indicator, and switch means arranged in the output circuit of the low voltage electronic switching device and operative to change the indicator from the on state to off state while connecting the indicator into the output circuit of the high voltage electronic switching device, the low voltage electronic switching device rendering the switch means operative when the source voltage is between the certain minimum and the certain maximum, the high voltage electronic switching device causing the indicator to change to the on state when the source voltage is above the certain maximum.

2. The condition indicator described in claim 1 wherein the electronic switching devices are transistors.

3. The condition indicator described in claim 2 wherein the input circuits for the transistors each includes a bias network comprising an impedance and a voltage breakdown device for biasing the associated transistor on when the source voltage attains the corresponding certain minimum or certain maximum.

References Cited

UNITED STATES PATENTS

| | | | |
|---|---|---|---|
| 1,343,196 | 6/1920 | Conway | 340—248 |
| 2,695,399 | 11/1954 | Martin | 340—410 |
| 2,728,069 | 12/1955 | Norton. | |
| 3,321,754 | 5/1967 | Grimm et al. | 340—249 |

JOHN W. CALDWELL, Primary Examiner

D. MYER, Assistant Examiner

U.S. Cl. X.R.

340—249